US012575575B2

(12) United States Patent
Lan

(10) Patent No.: US 12,575,575 B2
(45) Date of Patent: Mar. 17, 2026

(54) METHOD FOR PREPARING MUSHROOM ANTIBACTERIAL AGENT AND ANTIBACTERIAL AGENT MADE THEREFROM

(71) Applicant: Well Shine Biotechnology Development Co., Ltd., Taipei City (TW)

(72) Inventor: Chang Chou Lan, Taipei City (TW)

(73) Assignee: WELL SHINE BIOTECHNOLOGY DEVELOPMENT CO., LTD., Taipei City (TW)

( * ) Notice: Subject to any disclaimer, the term of this patent is extended or adjusted under 35 U.S.C. 154(b) by 506 days.

(21) Appl. No.: 17/986,621

(22) Filed: Nov. 14, 2022

(65) Prior Publication Data

US 2023/0083613 A1 Mar. 16, 2023

(30) Foreign Application Priority Data

Sep. 13, 2021 (TW) ................................. 11013410.8
Sep. 13, 2022 (TW) ................................. 11113459.1

(51) Int. Cl.
| | |
|---|---|
| *A01N 65/00* | (2009.01) |
| *A01P 1/00* | (2006.01) |
| *C11D 3/38* | (2006.01) |
| *C11D 3/48* | (2006.01) |

(52) U.S. Cl.
CPC ................ *A01N 65/00* (2013.01); *A01P 1/00* (2021.08); *C11D 3/38* (2013.01); *C11D 3/48* (2013.01)

(58) Field of Classification Search
None
See application file for complete search history.

(56) References Cited

PUBLICATIONS

DE-19911679-C2, 2003-06-18, Jansen R and Lindquist (Year: 2003).*
ES-2247104-T3, Mar. 1, 2006, Gabrizova L (Year: 2006).*
Hsiu-Man Lien et al. (Antimicrobial Activity of Antrodia camphorata Extracts against Oral Bacteria, PLoS ONE 9(8), 2014). (Year: 2014).*
Khaled F. El-tahlawy et. al. (The antimicrobial activity of cotton fabrics treated with different crosslinking agents and chitosan, Carbohydrate Polymers 60 (2005) 421-430). (Year: 2005).*
Thomas Bjarnsholt et. al. (Antibiofilm Properties of Acetic Acid, Advances in Wound Care, vol. 4, No. 7, Jul. 7, 2014). (Year: 2014).*

* cited by examiner

*Primary Examiner* — Anand U Desai
*Assistant Examiner* — Jacob A Boeckelman
(74) *Attorney, Agent, or Firm* — Birch, Stewart, Kolasch & Birch, LLP

(57) ABSTRACT

The present invention provides a method for preparing an antibacterial agent using a mushroom and an antibacterial agent made therefrom. The antibacterial agent is made by using a residue left after preparing health foods from mushrooms, treatment with alcohol to obtain a solid matter, treatment with IN sodium hydroxide after drying, autoclaving, rinsing with water, filtering for decolorization and treatment with 10N-15N sodium hydroxide as needed.

10 Claims, No Drawings

METHOD FOR PREPARING MUSHROOM ANTIBACTERIAL AGENT AND ANTIBACTERIAL AGENT MADE THEREFROM

TECHNOLOGY FIELD

The present invention relates to a method for preparing an antibacterial agent using a mushroom and an antibacterial agent made therefrom.

BACKGROUND OF THE INVENTION

Mushroom crops, such as *Antrodia camphorata*, a mushroom whose fruiting body is very rare and expensive, grows slowly in the wild and is extremely difficult to breed in the greenhouse. In Taiwan, the fruiting body of *Antrodia camphorata* has traditionally been used as a Chinese herbal medicine, and it is often called "jang-jy" or "niu-chang-chih" (Shen C. C. et al., J. Chin. Med. 2003, 14, 247-258).

In nature, *Antrodia camphorata* grows on the inner wall of Cinnamomun kanehiraiHay (Lauraceae), which is a unique and endangered indigenous species in Taiwan. The fruiting body of wild *Antrodia camphorata* contain fatty acids, lignans, sesquiterpenes, phytosterols, triterpenoids, etc. In traditional Chinese medicine, many mushroom crops have specific therapeutic effects. For example, the fruit body of *Antrodia camphorata* has been used to treat food and drug poisoning, diarrhea, abnormal pain, high blood pressure, itchy skin, and liver cancer, and thus widely used in medicines or health foods. However, if the residues of mushroom crops, such as the fruiting bodies of *Antrodia camphorata* that left after the preparation of medicines or health foods, can be utilized effectively, the residue issues can be solved and more profits can be created.

SUMMARY OF THE INVENTION

In view of the above problems, the present invention provides a method for preparing an antibacterial agent using a mushroom and an antibacterial agent made therefrom.

Different from the preparation of the antibacterial agent using chitosan that is obtained through acid hydrolysis of chitin in the past, the present invention unexpectedly found that the mushroom extract after alkali treatment can be used as an effective antibacterial agent.

The present invention provides a method for preparing an antibacterial agent using a mushroom, which comprises the steps of: (1) grinding a fresh dried mushroom raw material; (2) soaking the dried mushroom raw material that has been ground in a 95% alcohol for decolorization treatment; (3) filtering and collecting a residue after treatment, followed by heating and drying to obtain a crude extract; (4) using IN sodium hydroxide to process the crude extract obtained in the previous step by high-temperature steaming; (5) rinsing the crude extract that has been steamed with deionized water for neutralization; (6) collecting by filtration; (7) decolorizing with hydrogen peroxide; (8) washing centrifugally with water to obtain a prototype of the antibacterial agent, which can be applied to cleaning and antibacterial use in general life.

In accordance with the present invention, a step of soaking a residue of the dried mushroom raw material collected from the organic solvent in an aqueous solution for performing treatment of removing water-soluble components may be further comprised between step (2) and step (3).

In accordance with the present invention, a step (9) of treating with 10N-15N sodium hydroxide may be further comprised, and then a solid matter is obtained through washing centrifugally with water.

In accordance with one embodiment of the present invention, wherein the mushroom is *Antrodia camphorata*.

In accordance with one embodiment of the present invention, wherein the mushroom is *Antrodia camphorata*.

In accordance with one embodiment of the present invention, wherein the mushroom is *Antrodia camphorata*.

In accordance with one embodiment of the present invention, for example, the method mentioned above further comprises conversion into pulp, followed by acetic acid treatment for use in agricultural products.

In accordance with one embodiment of the present invention, for example, the method mentioned above further comprises making an aqueous solution for general household cleaners, such as a detergent washing solution for cleaning and bleaching in place of chitin products treated with hydrochloric acid.

In accordance with one further embodiment of the present invention, for example, the method mentioned above further comprises freeze-drying to obtain a solid antibacterial agent that can be used for fabric manufacturing or sterilization and purification manufacture of medical equipment or medical beauty products.

In another aspect, the present invention also provides a broad-spectrum antibacterial agent manufactured by the aforementioned methods

DETAILED DESCRIPTION OF THE INVENTION

Unless otherwise defined, all technical and scientific terms used herein have the same meaning as commonly understood by people having ordinary skill in the art to which this invention belongs. It is to be understood that the terminology used herein is for the purpose of describing specific embodiments only and is not intended to be limiting.

As used herein, the singular forms "a, an" and "the" include plural references unless the content clearly dictates otherwise. Therefore, for example, reference to "a sample" includes a plurality of such samples and equivalents thereof known to those skilled in the art.

The present invention provides a method for preparing an antibacterial agent using mushroom residues, which comprises the steps of: (1) grinding a fresh dried mushroom raw material; (2) soaking the dried mushroom raw material that has been ground in a 95% alcohol for decolorization treatment; (3) filtering and collecting a residue after treatment, followed by heating and drying to obtain a crude extract; (4) using IN sodium hydroxide to process the crude extract obtained in the previous step by high-temperature steaming; (5) rinsing the crude extract that has been steamed with deionized water for neutralization; (6) collecting by filtration; (7) decolorizing with hydrogen peroxide; (8) washing centrifugally with water to obtain a prototype of the antibacterial agent, which can be applied to cleaning and antibacterial use in general life.

In accordance with the method of the present invention, a step of soaking a residue of the dried mushroom raw material collected from the organic solvent in an aqueous solution for performing treatment of removing water-soluble components is further comprised between step (2) and step (3).

In accordance with the method of the present invention, a step (9) of treating with 10N-15N sodium hydroxide may be further comprised, and then a solid matter is obtained through washing centrifugally with water.

The present invention further utilizes the *Antrodia camphorata* residues that left after the preparation of *Antrodia camphorata* health foods. The method of the present invention is characterized by conduct secondary alkali treatment twice, wherein the first time alkali treatment uses IN sodium hydroxide, and the second time alkali treatment uses 10-15N sodium hydroxide, preferably 10N sodium hydroxide.

In accordance with the present invention, the decolorization method can be treated with a decolorizing agent, which can be selected from the group consisting of ozone, hydrogen peroxide or a combination thereof.

In accordance with the present invention, the obtained product contains *Antrodia camphorata* chitin polysaccharides, in which polysaccharides and chitin interleaved to form a shell that is flexible and gives the fungal cell shape, thereby not only preventing damaging macromolecules (such as catabolic enzymes) from invading, but also having high permeability, so the resultant antibacterial agent has the advantages of high biocompatibility, no biological toxicity, low production cost, easy modification, high mechanical strength, etc., and can be made into films, powders, granules, spherical, fibrous or gelatinous etc. forms.

The present invention is further illustrated by the following examples, which should be construed to be illustrative only and not to limit the remainder of the invention in any way. Without further elaboration, it is believed that people having ordinary skill in the art can utilize the present invention to its fullest extent based on the description herein

Example 1 Preparation of the Antibacterial Agent

The process method of the present invention includes two stages:

The First Stage—Crude Extraction Step:

The artificial cultivated *Antrodia camphorata* fruiting body raw material were harvested and examined, and then ground after being dried at 85° C. for 6 hours. The first decolorization treatment was carried out for 72 hours with 95% alcohol that has 10 times the volume of the raw material. The solid matter was collected by filtration and optionally treated with 100° C. hot water that has 10 times the volume of the solid matter for 8 hours to remove water-soluble components, followed by filtration to obtain a crude extract resulted from the solid matter dried at 90° C. The Second Stage—Treatment for Formation:

The crude extract obtained in the previous stage was treated with IN sodium hydroxide that has 4.5 times the volume of the crude extract at 121° C. under 1.5 Ba for 20 minutes to carry out the autoclaving reaction step for accelerating the reaction. After repeated washing and neutralization with deionized water, sieving and filtrating, the second decolorization was carried out with decolorizing agent, hydrogen peroxide, that has 2 times the volume of the crude extract at 50° C. for 24-48 hours. The solid matter was obtained through washing centrifugally with water to obtain the antibacterial agent of the present invention. For comparison, a slightly acidic antibacterial agent was obtained by treatment with acetic acid.

Further processing treatment:

(1) If it was made into agricultural products, the antibacterial agent prototype was converted into pulp, followed by slightly acidic neutralization at pH4-6 by adding acetic acid.

(2) If it was an antibacterial agent in liquid form for daily life, the prototype of the obtained antibacterial agent was formulated into an aqueous solution, which can be used as a detergent for cleaning and bleaching, and can replace the chitin treated with hydrochloric acid which used often currently.

(3) To obtain the prototype of alkaline antibacterial agent, the antibacterial agent prototype was treated with 10-15N NaOH that has 2 times the volume of the antibacterial agent prototype at 1000C for 2 hours, centrifuged to get the solid, and then freeze-dried to obtain the white powder.

Example 2 Antibacterial Effect of the Antibacterial Agent

For the antibacterial effect of the antibacterial agent, each sample prepared by the above-mentioned method were put into the antibacterial experiments against the following strains: *Staphylococcus aureus, Escherichia coli, Pseudomonas aeruginosa, Aspergillus brasiliensis (Aspergillus niger), Candida albicans* and *Bacillus subtilis.*

The desired bacterial counts of *Escherichia coli* (ATCC 8739), *Pseudomonas aeruginosa* (ATCC 9027), *Staphylococcus aureus* (ATCC 6538), *Bacillus subtilis* (ATCC 6633), *Candida albicans* (ATCC 10231) and *Aspergillus niger* (ATCC 16404) were regulated to approximately 107 CFU/mL. 0.1 mL of the bacterial suspension was added into 10 mL of the solution to be tested (the experimental group), and the 0.85% sterile normal saline was used as the control group. After the inoculation, the reaction was carried out respectively at 25±2° C. for 30 minutes, and the experimental group and the control group were respectively subject to 10-fold serial dilution (0-105) with 9 mL of 0.85% sterile normal saline, followed by inoculation to the PCA medium. The mediums were placed under appropriate culture conditions (culture temperature layer: 35° C., 48 hours) for cultivation. The growth conditions were observed and photographed respectively, and the numbers of colony were recorded. The antibacterial results are expressed in terms of the antibacterial ability, of which the formula is as follows:

Antibacterial ability %=(bacterial number of control group-bacterial number of experimental group)/bacterial number of control group×100%

The tested antibacterial ability results of the antibacterial agent obtained according to the method of the present invention, the commercially available chitosan antibacterial agent and the slightly acidic antibacterial agent are shown in table 1.

TABLE 1

The antibacterial ability power of the antibacterial agent
prepared by the mushroom matrix of the present invention.

| | slightly acidic antibacterial agent | Alkaline antibacterial agent without treatment of water-soluble components removal | Alkaline antibacterial agent with treatment of water-soluble components removal | Antibacterial agent with secondary alkali treatment of the present invention | Commercially available chitosan antibacterial agent |
|---|---|---|---|---|---|
| *Escherichia coli* | —* | >99.99% | 40.65% | 99.98% | — |
| *Pseudomonas aeruginosa* | — | >99.99% | — | >99.99% | — |
| *Staphylococcus aureus* | — | 95.65% | 80.95% | >99.99% | 13.51% |
| *Bacillus subtilis* | 91.31% | 61.56% | 78.38% | >99.99% | — |
| *Candida albicans* | 35.26% | 75.00% | 82.12% | >99.99% | — |
| *Aspergillus niger* | — | 13.33% | 3.81% | 63.81% | 15.24% |

*Indicating no antibacterial effect.

As shown in Table 1, the commercially available chitosan antibacterial agent only has slightly antibacterial effect on *Staphylococcus aureus* and *Aspergillus niger*, of which the antibacterial ability has not reached 20%, and has no antibacterial effect on other strains. As for the slightly acidic antibacterial agent obtained by acid treatment, only good antibacterial effect is achieved on *Bacillus subtilis*, slightly antibacterial effect is achieved on *Candida albicans*, and no antibacterial effect is got on other strains. According to the present invention, for example, the alkaline antibacterial agent treated with water-soluble components removal has a broad-spectrum antibacterial effect, especially on *Staphylococcus aureus, Bacillus subtilis* and *Candida albicans*, of which the antibacterial abilities were all more than 78%. The alkaline antibacterial agents without treatment of water-soluble components removal have excellent antibacterial effects on *Escherichia coli, Pseudomonas aeruginosa* and *Staphylococcus aureus*, of which the antibacterial abilities are all above 95%. The secondary alkali treated antibacterial agent obtained after further secondary alkali treatment produces the most excellent antibacterial effect, of which the antibacterial abilities against *Escherichia coli, Pseudomonas aeruginosa, Staphylococcus aureus, Bacillus subtilis* and *Candida albicans* all reach 99%, and the antibacterial ability against *Aspergillus niger* even reaches 63.81%.

People having ordinary skill in the art will appreciate that changes may be made to the specific embodiments described above without departing from the broader inventive concept thereof. Therefore, it is to be understood that the present invention is not limited to the particular embodiments disclosed, but is intended to cover modifications within the spirit and scope of this invention as defined by the appended claims.

What is claimed is:

1. A method for preparing an antibacterial agent using *Antrodia camphorata*, comprising the steps of: (1) grinding a fresh dried raw material of *Antrodia camphorata* to obtain a ground and dried material; (2) soaking the ground and dried material obtained in the step (1) in a 95% alcohol for decolorization to obtain a decolorized material; (3) filtering the decolorized material obtained in the step (2) and collecting a residue, followed by a heating and drying step; (4) high-temperature steaming the residue obtained in the step (3) with 1 N sodium hydroxide; (5) rinsing and steaming the residue obtained in the step (4) with deionized water for neutralization; (6) collecting by filtration and decolorizing with hydrogen peroxide, and washing centrifugally with water to obtain a prototype of an antibacterial agent, which can be further processed to obtain an antibacterial agent for use in general life;

wherein the antibacterial agent has antibacterial activity against *Escherichia coli, Pseudomonas aeruginosa, Staphylococcus aureus, Bacillus subtilis, Candida albicans* and *Aspergillus niger.*

2. The method of claim 1, further comprising a step of soaking the decolorized material as obtained in the step (2) to obtain a residue from the alcohol in an aqueous solution to remove water-soluble components before the step (3).

3. The method of claim 1, further comprising a step (7) of treating the prototype of the antibacterial agent with 10N-15N sodium hydroxide, and then washing it centrifugally with water to obtain a solid form of the antibacterial agent.

4. The method of claim 2, further comprising a step (7) of treating the prototype of the antibacterial agent with 10N-15N sodium hydroxide and then washing it centrifugally with water to obtain a solid form of the antibacterial agent.

5. A method for preparing an antibacterial agent using *Antrodia camphorata*, comprising the steps of: (1) grinding a fresh dried raw material of *Antrodia camphorata* to obtain a ground and dried material; (2) soaking the ground and dried material obtained in the step (1) in a 95% alcohol for decolorization to obtain a decolorized material; (3) soaking, the the decolorized material obtained in the step (2) filtering and collecting it followed by a heating and drying step to obtain residue; (4) high-temperature steaming the residue obtained in the step (3) with 1 N sodium hydroxide; (5) rinsing and steaming the residue obtained in the step (4) with deionized water for neutralization; (6) collecting by filtration and decolorizing with hydrogen peroxide washing centrifugally with water, treating with 10N-15N sodium hydroxide and then washing centrifugally with water to obtain a solid form of the antibacterial agent;

wherein the antibacterial agent has antibacterial activity against *Escherichia coli, Pseudomonas aeruginosa, Staphylococcus aureus, Bacillus subtilis, Candida albicans* and *Aspergillus niger.*

6. The method of claim 1, wherein the the *Antrodia camphorata* is fruiting body of *Antrodia camphorata.*

7. The method of claim 1, wherein the aqueous solution is suitable for use with general household cleaners.

8. The method of 7, wherein aqueous solution is suitable for use as a detergent for cleaning and bleaching.

9. The method of claim 5, wherein the solid antibacterial agent is used for fabric manufacturing.

10. A broad-spectrum antibacterial agent obtained by the method of claim 1.

* * * * *